Oct. 17, 1972 — C. R. PICEK ET AL — 3,699,007

EVAPORATING-CONCENTRATING APPARATUS AND METHOD

Original Filed May 19, 1969 — 2 Sheets-Sheet 1

*INVENTORS*
CHARLES RICHARD PICEK
CORNELIS VAN HOEK
BY Thomas M. Hammond
ATTORNEY

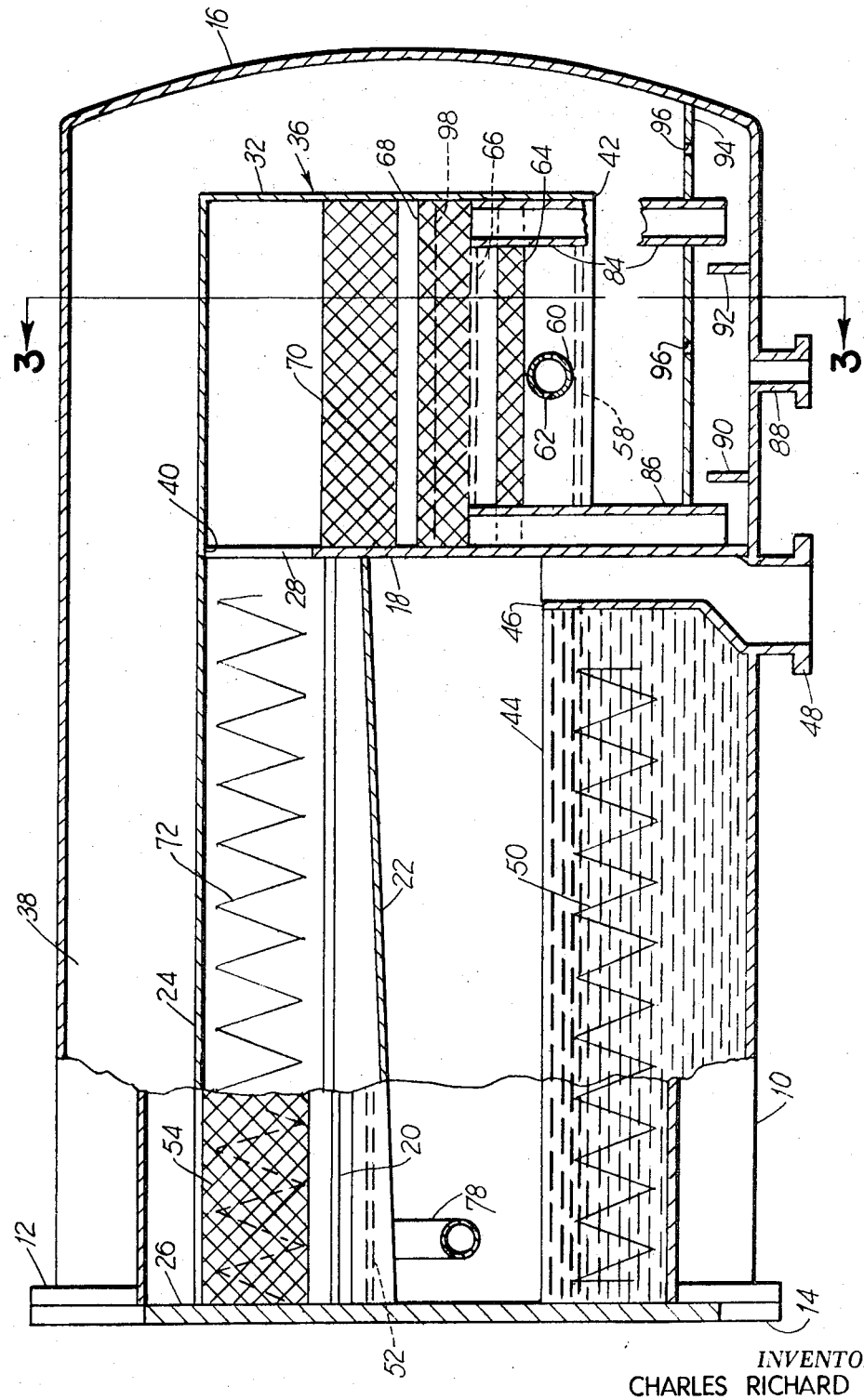

United States Patent Office 3,699,007
Patented Oct. 17, 1972

3,699,007
EVAPORATING-CONCENTRATING APPARATUS AND METHOD
Charles Richard Picek, Cheshire, and Cornelis van Hoek, Niantic, Conn., assignors to American Machine & Foundry Company
Continuation of abandoned application Ser. No. 825,488, May 19, 1969. This application Mar. 12, 1971, Ser. No. 123,886
Int. Cl. B01d 3/22, 47/00
U.S. Cl. 203—40
8 Claims

ABSTRACT OF THE DISCLOSURE

The invention is for an evaporating-condensing concentrator and for a method which increases the proportion of a solute in a liquid, such as increasing the concentration of boric acid in water. The apparatus is constructed to take advantage of relatively high-velocity flows through sharp-edged orifices of the sieve plates which are used in conjunction with drowned mesh scrubbers, thereby affording an unusually low carry-over of solids and gases in the distillate while greatly reducing the space required by conventional constructions. Moreover, the apparatus and method preferably includes means and process steps for recycling or refluxing at least part of the purified concentrate as cleansing liquid.

---

This application is a continuation of application Ser. No. 825,488, entitled Evaporating-Concentrating Apparatus and Method, by C. R. Picek et al., filed May 19, 1969.

This invention relates to evaporating-condensing concentrators and to a method for increasing the concentration of solids and gases dissolved in a liquid and is particularly useful in concentrating radioactive boric acid and associated gases which occur in the operation of boric acid water moderated nuclear reactors.

In presently known evaporating-condensing concentrators difficulties have been encountered in avoiding carry-over of at least a significant portion of the impurities in the distillate. Moreover, the space required for conventional demisting of the vapor stream is excessive and results in increased costs for the housing as well as increased space requirements to accommodate it. Consequently, there exists a need for evaporating-condensing concentrators and a method for evaporating and condensing which do not exhibit these disadvantages.

Accordingly, it is an object of the invention to provide an evaporating-condensing concentrator and method in which the vapor stream is relieved of entrained mist and droplets of entrained solids by providing for intimate mixing of the entrained solids with a cleansing liquid which is then diverted from the path of the purified vapor stream.

It is further the object of this invention to provide an evaporating-condensing refluxing concentrator having reduced space requirements. It is still a further object of the invention to provide a novel method of substantially simultaneous mist evaporating and vapor scrubbing at a point downstream from the primary boil-off.

In order to more fully understand how these objects and others implicit in the invention are achieved, reference is made to the following specification together with the attached drawings wherein:

FIG. 2 is an elevational view in sections of an evaporating-condensing refluxing concentrator according to the invention taken in part on line A—A and in part on line B—B of FIG. 1.

Figure 1:
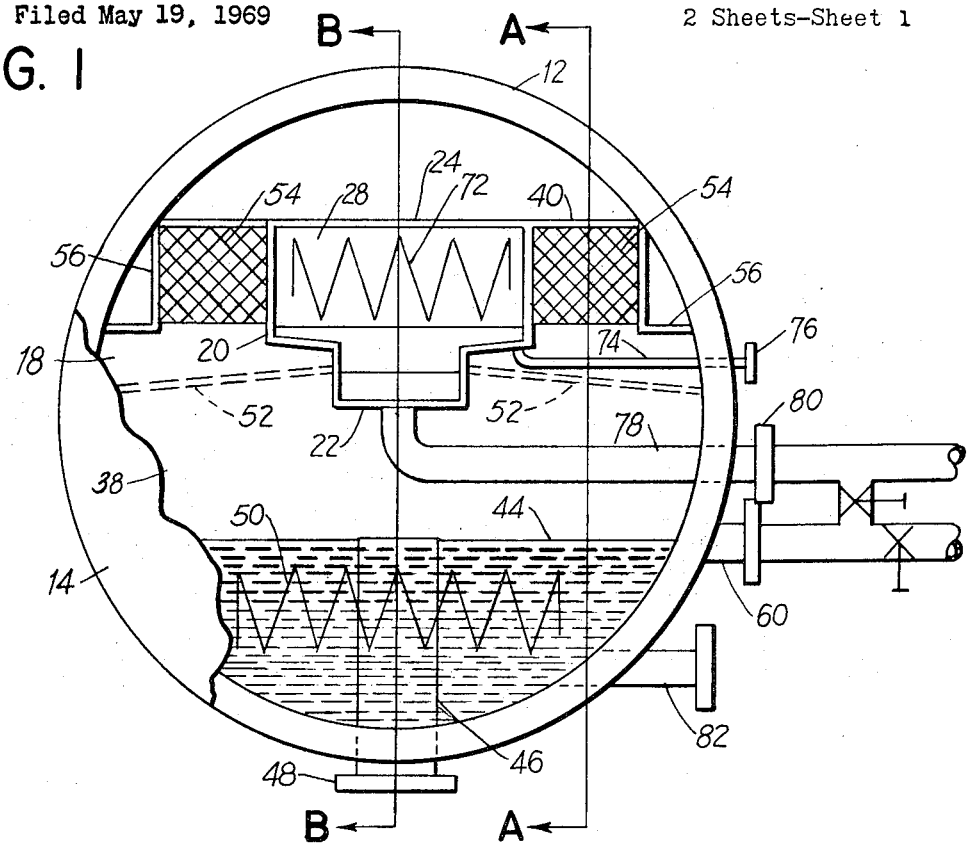
FIG. 1 is a transverse view partly in section of an evaporating-condensing refluxing concentrator according to the invention.

Apparatus according to the invention includes a horizontal cylindrical metallic housing 10 having a flange 12 and a cover 14 at one end, the cover being secured to the flange by any convenient means, such as, bolts or studs and nuts, for example, to tightly seal the housing. The other end of housing 10 is closed by a conventional cover 16 which is preferably welded in place. A transverse partition 18 extends upwardly from the bottom of said housing and is secured in place with a fluid-tight joint. A trough-like duct 20 having a longitudinally sloping bottom 22, a top plate 24 and fluid-tight joints throughout is secured in sealed relationship to partition 18 and is arranged in abutting sealing relationship with the interior surface 26 of cover 14.

The upper edge of partition 18 has a cut-out or notch 28 which affords access to the interior of duct 20. Top plate 24 extends across partition 18 to the side thereof remote from the duct and in conjunction with partition 18 and plates 30, 32 and 34 form a box-like enclosure 36 which is open at the bottom and in communication with the interior of duct 20 via notch 28. Consequently, the only access from the space 38 on the left hand side of partition 18 (as seen in FIG. 2) to the interior of duct 20 is passage upward on either side of the duct, over the top-plate 24 and the upper edge 40 of partition 18 and thence downward around enclosure 36, under its bottom edge 42 and then upward and on through notch 28.

Space 38 affords accommodation for incoming liquid 44 which is to be concentrated. The liquid is held at a desired height by a conventional level controlling overflow pipe 46 that passes through the wall of housing 10 and has a suitable coupling, such as, flange 48 for connection to other structure such as storage, recycling lever, drainage or the like (not shown). A suitable heat exchanger shown schematically at 50 and of any convenient type is submerged in the liquid to transmit heat for its distillation. Corrugated perforated plates generally referred to by numeral 52 extend from each side of duct 20 to the sides of housing 10, as indicated in FIG. 1, and extend from partition 18 to the inner surface 26 of cover 14. These plates serve as coarse demisters to arrest the upward flow of surges and large drops of liquid. A pair of fine demisters 54 made up of stacked sheets of mesh material, such as woven wire mesh, are mounted on the sides of duct 20 and extend along the length of the duct spreading laterally from the vertical walls thereof to the support angles 56 which are secured to the inner surface of housing 10 as shown in FIG. 1. As mentioned before, fine demisters comprise numerous, preferably horizontally arranged, contiguous layers of woven wire mesh serving to coalesce and precipitate, for return to the main body of liquid 44, droplets and mist entrained in the up-flowing vapor stream. Plate 52 and fine demisters 54 are optional but preferred on the entrance side of partition 18. When they are not employed, the height of space 38 should be increased to assure that no droplets and mist pass out to the other side of the partition where the major scrubbing and refluxing takes place.

The enclosure 36 contains a sieve plate 58, preferably having drilled sharp-edged holes, a horizontally disposed spray pipe 60 having openings 62 located above sieve plate 58 and arranged to cover evenly the whole area of plate 58 with liquid. Spaced above spray pipe 60 is a block 64 of contiguous layers of woven wire mesh whose function will be later explained. Disposed slightly above mesh block 64 is a second sieve plate 66 preferably with drilled holes and located so that it is in intimate contact with another mesh block 68 which generally resembles block 64 in structure and function.

Disposed above block 68 is a demister 70 which also comprises a number of contiguous layers of woven wire mesh.

Above the demister 70 is the notch 28 leading to the interior of duct 20 in which is situated condensing heat exchanger 72 of any convenient design. A pipe 74 leads from the interior of duct 20 near its mid-height to the exterior of housing 10 where it may conveniently terminate in a coupling such as flange 76. Pipe 74 serves as a vent for gases in the duct. A second pipe 78 leads from near the lowest point in duct 20 to the exterior of housing 10 and preferably terminates in a flange coupling 80. Pipe 78 serves as a drain for condensate. Liquid 44, to be processed, is introduced into the housing by a conveniently positioned pipe 82.

Figure 3:
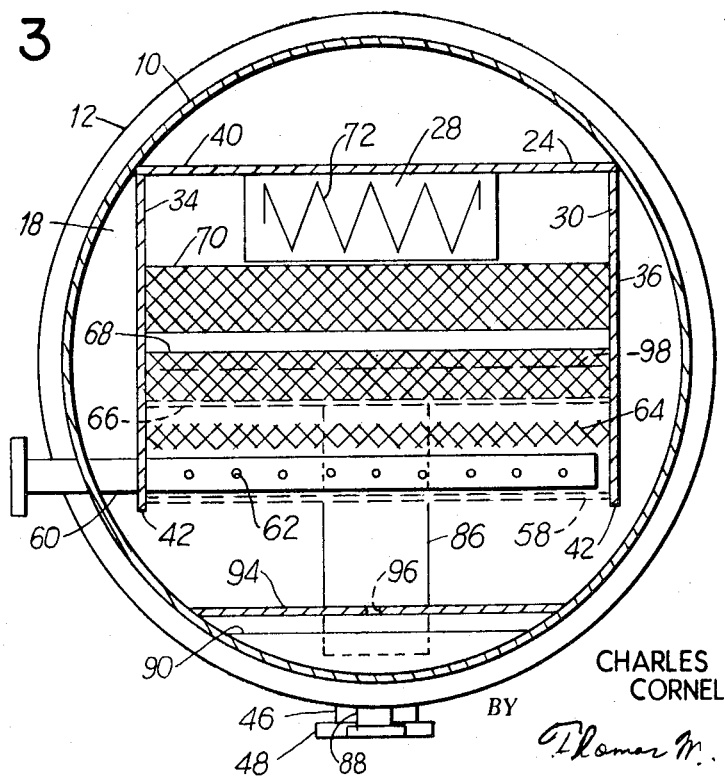
FIG. 3 is a transverse section taken on the line 3—3 of FIG. 2.

A pair of down-comers 84 and 86, positioned as shown in FIGS. 2 and 3, lead from the upper side of sieve plate 66 to a point close to the bottom of housing 10 for discharge of liquid through drain pipe 88. Vapor blow-by is prevented by constant-level weirs 90 and 92 which extend upwardly to a point higher than the bottoms of the down-comers. A perforate plate 94 through which the down-comers pass has a number of drain holes 96 and is secured in housing 10 slightly above the weirs. This plate protects liquid flowing to drain pipe 88 from blast by vapor passing under the edge 42 of enclosure 36.

In operation, liquid 44 is delivered through pipe 82 and maintained at a constant level by over-flow pipe 46. Heat furnished through exchanger 50 boils the liquid and the resulting vapor stream passes upward through corrugated perforated plates 52 and demisters 54 where a large portion of the liquid and the finely divided solids entrained in the vapor stream are removed in the well-known manner and drop back into the main body of liquid. The vapor stream next passes over top-plate 24, then downwardly around enclosure 36 and under its bottom edge 42, at which point more of the entrained content of the vapor stream is thrown down by inertia for discharge through pipe 88.

The vapor stream now passes upward through sieve plate 58 whose upper surface is continuously and evenly flooded by reflux drawn from pipe 78 by a pump (not shown) and delivered through spray pipe openings 62. During its passage through the plate some of the remaining entrained mist is flashed into vapor by the pressure reduction due to the vena contracta effect occurring at this point. The change of state releases the solid content of the transformed mist for solution in the reflux which has been broken up into small drops and is carried upward by the vapor into mesh block 64. Block 64 serves as a mixer and a scrubber whose passages bring the reflux into intimate contact with the vapor stream and its entrained impurities. Although block 64 is flooded with liquid, it is not thick enough to hold back the stream which comprises vapor, mist, some free impurities and finely divided reflux. This mixed stream now passes through sieve plate 66 and into contiguous mesh block 68.

The substantially isothermal chain of events although at this stage of operation not precisely understood, apparently proceed as follows and involve a combination of events which take place simultaneously.

The small diameter of the holes in sieve plate 66 forces the components of the vapor stream into intimate contact so that the free impurities have an opportunity to be absorbed or dissolved by reflux. the vena contracta effect with its attendant reduction in pressure causes mist (and probably some reflux) to vaporize, whereby more impurities are released for solution in the liquid phase present and after passage from the low-pressure area some of the vapor probably recondenses into the form of mist.

Subsequently, the liquid-vapor mixture enters the mesh block 68 where the vapor is free to pass upward and on through emergency demister 70 and into duct 20 wherein it is condensed by heat-exchanger 72 for withdrawal as a liquid through pipe 78. The second mesh block 68 being thicker than mesh block 64 makes it possible for the liquid content to rise to an appreciable height (as indicated by liquid level line 98 of FIGS. 2 and 3) without breaking through on the top side. Under these conditions, the liquid content of block 68 is free to flow sideways through the mesh until it escapes via down-comers 84 and 86 which shield it from the kinetic energy of the vapor stream which moves at a speed in a range of about 50 to about 200 feet per second in an apparatus designed particularly for boric acid concentrators. As mentioned earlier, the down-comers have water-tight seals at the bottom to prevent vapor blow-by. In addition to their above described functions, the sieve plates 58 and 66 serve to maintain a uniform distribution of pressure across the vapor stream and so prevent localized disturbances in the reflux distribution pattern in the mesh blocks 64 and 68.

As mentioned hereinabove, apparatus according to the invention constructed particularly for boric acid concentration can be operated with a vapor stream flow at speeds in a range of about 50 to about 200 feet per second under favorable conditions of temperature and pressure. Generally, the number of openings in the sieve plates 58 and 66 and the thickness of mesh block on scrubber 68 as well as the distance between the sieve plates and mesh blocks 64 and 68 can vary depending upon the particular types of liquid systems being processed and the pressure and temperature conditions to be employed. In any event, however, the sieve plates should contain the required number of openings and the block 68 should be of a thickness such that when the optimum distance is maintained between the sieve plates and both mesh blocks 64 and 68, the kinetic energy of the vapor stream will not prevent the sideways flow of liquid in block 68 and will permit the liquid to escape via the down-comers while at the same time a uniform distribution of pressure across the vapor stream is maintained, thereby preventing localized disturbances in the reflux distribution pattern in the mesh blocks 64 and 68 under given conditions of temperature and pressure. The particular parameters for a given liquid system and set of operating conditions is readily determinable. Under optimum operating conditions with boric acid/water systems, boron carryover can be reduced to ranges of less than 10 parts per million in the condensate.

In method terms this invention comprises generally vaporizing liquid to be purified at least in part and subsequently conducting the vapor including some entrained unvaporized liquid as well as non-liquid components in a downstream direction where it passes through a first permeable barrier while the downstream side of that barrier is flooded by a cleansing liquid. Accordingly a common stream of the vapor and cleansing liquid is formed which is then passed through a first foraminous barrier and causes mixing of the vapor and the cleansing liquid to an even greater degree after which the mixed stream vapor and cleansing liquid is conducted through a second permeable barrier and then into a second foraminous barrier which is disposed against the second permeable barrier. The second foraminous barrier is somewhat thicker than the first foraminous barrier and the mixed stream of vapor and liquid partially floods this barrier and becomes even more intimately mixed causing a removal of the non-liquid components from the vapor to the cleansing liquid. The cleansing liquid including the non-liquid components removed from the vapor is then conducted to a collection zone while the vapor is conducted to a condensing zone after which it is collected as purified liquid.

It is preferable, although not necessary, in practicing this invention in its broadest concepts that the purified liquid be recycled as a cleansing liquid after condensation.

In carrying out the method of the invention it is to be noted that the vapor and cleansing liquid assume a vena contracta flow characteristic as they pass through the first permeable barrier. Such a characteristic brings about pressure reduction at this point and at least some of the remaining entrained mist is flashed into vapor. The change of state releases the solid content of the transformed mist for solution in the cleasing liquid which may or may not be reflux, that is, recycled purified condensate which has been broken up into small drops and is carried by the vapor into the second foraminous barrier.

Generally, the cleansing liquid including the non-liquid components removed from the vapor are conducted in an upstream direction for collection. However, they may be carried off in any other suitable manner so long as separation from the vaporized material being processed is maintained.

Moreover, the vapor to be processed can be demisted either before it is conducted through the first permeable barrier, after it is passed through the second foraminous barrier or at both points if desirable. Moreover, such demisting steps are preferred although not necessary in the broadest aspects of the operation of the method of this invention.

As mentioned hereinabove, in regard to the apparatus there is a wide latitude in carrying out the method of this invention at which stream flow moves. Any particular speed will depend upon the material being processed under favorable conditions of temperature and pressure. Accordingly, in a particular case where a specific material is to be purified the most beneficial pressure, temperatures and stream flow speed is readily determinable.

Numerous advantages and modifications of the evaporating-condensing reflux concentrator of this invention will be readily apparent to those skilled in the art. Consequently, many modifications of the invention may be made without departing from the spirit and scope thereof. Accordingly, the invention is not to be limited by the described embodiments herein except as defined in the appended claims.

What is claimed is:

1. Apparatus for removing a vapor impurity from a vapor stream, comprising:
   means for directing the vapor stream upwardly in a vertical direction,
   a first liquid and vapor permeable barrier means disposed across said vapor stream for defining one boundary of a liquid-vapor mixing and scrubbing region,
   a liquid-vapor scrubbing means disposed within said region in spaced relationship above said first barrier means,
   means for continuously filling to overflowing with a cleansing liquid the region bounded by the first permeable barrier and the top of the scrubbing means, said cleansing fluid having an affinity for said vapor impurity,
   the permeable characteristics of the first barrier means, the characteristics of the liquid and the velocity of the vapor passing through the barrier means being proportioned to prevent said cleansing fluid from flowing downwardly through the permeable barrier means, whereby said cleansing liquid and vapor are mixed and the vapor is scrubbed in said region so that vapor impurity is absorbed or dissolved into the liquid and thereby removed from the vapor stream,
   a second liquid and vapor permeable barrier means disposed in said vapor stream in spaced relationship above said liquid-vapor scrubbing means,
   liquid and vapor permeable separating means disposed in said vapor stream above said second liquid and vapor permeable barrier means,
   means for directing liquid overflowing the scrubbing means through said second permeable barrier means and into the separating means, whereby the overflowing liquid with vapor impurity therein and the remaining vapor pass in a common stream upwardly to said separating means,
   means for withdrawing liquid from said separating means and out of said vapor stream, and
   means for withdrawing cleansed vapor from the separating means.

2. Apparatus for removing a vapor impurity from a vapor stream, comprising
   means for directing the vapor stream upwardly in a vertical direction,
   a first sieve plate disposed across said vapor stream and being substantially uniformly permeable across said stream,
   a mesh block scrubbing means disposed in said vapor stream in spaced relationship above said first sieve plate,
   means for continuously filling to overflowing with a cleansing liquid the region bounded by the sieve plate and the top of the scrubbing means, said cleansing fluid having an affinity for said vapor impurity,
   the permeable characteristics of the first sieve plate, the characteristics of the liquid and the velocity of the vapor stream passing through the sieve plate being proportioned to prevent said cleansing liquid from flowing downwardly through the sieve plate, whereby said cleansing liquid and vapor are mixed in the region between the sieve plate and scrubbing means and the vapor stream is scrubbed in the scrubbing means to cause said vapor impurities to be absorbed or dissolved in said liquid,
   a second sieve plate disposed across said vapor stream in spaced relationship above said scrubbing means,
   a second mesh block having a given thickness disposed above said second sieve plate and across said stream,
   means for directing upwardly through said second sieve plate and into said second mesh block the vapor and liquid overflowing the scrubbing means,
   the permeable characteristics of the second sieve plate, the velocity of the liquid and vapor passing through the second sieve plate being proportioned to prevent liquid from passing downwardly from the second mesh block through the second sieve plate,
   means for maintaining the liquid level in said second mesh block below the top surface of said mesh block, said last named means comprising means for withdrawing liquid from said second mesh block and out of said vapor stream, and
   means for directing cleansed vapor away from the second mesh block and away from said withdrawn liquid.

3. The apparatus claimed in claim 2 wherein said cleansed vapor is vapor of said cleansing liquid the apparatus further includes,
   means for condensing said cleansed vapor that is directed away from the second mesh block, and
   means for passing at least a portion of the condensed cleansed vapor to said means for continuously filling to overflowing the region bounded by the first sieve plate and the scrubbing means.

4. The combination claimed in claim 3 where the cleansing liquid is water.

5. The combination claimed in claim 2 wherein said means for continuously filling to overflowing the region bounded by the first sieve plate and the scrubbing means includes a liquid conduit having a discharge in said region between the first sieve plate and the scrubbing means.

6. The method of removing a vapor impurity from a vapor stream, comprising
   continuously flooding a sieve plate with a cleansing liquid having an affinity for said vapor impurity,
   passing said vapor stream upwardly through said sieve plate with sufficient velocity to prevent said liquid from flowing downwardly through the sieve plate, mixing the vapor of said stream and said liquid in the region above the sieve plate, passing the mixed vapor and continuously flooding liquid in a common stream upwardly through a scrubbing means spaced above the sieve plate, whereby vapor impurity is absorbed or dissolved in the cleansing liquid and thus removed from the vapor stream, passing said vapor stream and liquid with vapor impurity absorbed or dissolved therein in a common stream upwardly from the scrubbing means to a liquid-vapor separating means spaced above the scrubbing means, withdrawing the liquid with the vapor impurity absorbed or dissolved therein from said separating means and out of the vapor stream, and withdrawing cleansed vapor from said separating means.

7. The method of removing a vapor impurity from a vapor stream, said method including a substantially isothermal chain of events comprising the steps of continuously flooding a first sieve plate with a cleansing fluid that has an affinity for said vapor impurity, passing said vapor stream upwardly through said sieve plate with sufficient velocity to prevent said liquid from flowing downwardly through the sieve plate, mixing the vapor of said stream and said liquid in the region above the sieve plate, passing the mixed vapor and continuously flooding liquid upwardly through a mesh block spaced above the sieve plate to scrub the vapor and thereby cause the liquid to absorb or dissolve said vapor impurity and remove it from the vapor stream, passing the vapor stream and the liquid in a common stream upwardly from the first mesh block through a second sieve plate spaced above the first mesh block, partially flooding a second mesh block disposed above the second sieve plate with the liquid in said common stream that passes upwardly through the second sieve plate, withdrawing from the second mesh block and from the vapor stream the liquid with the vapor impurity absorbed or dissolved therein, said withdrawing of liquid maintaining the liquid level in the second mesh block below the top surface thereof, and withdrawing cleansed vapor from the second mesh block.

8. In the method of claim 7 wherein the cleansed vapor is vapor of said cleansing liquid, the additional steps for providing reflux cleansing liquid, comprising condensing said cleansed vapor withdrawn from said second mesh block, and passing at least a portion of the condensed vapor to the first sieve plate to continuously flood said first sieve plate.

References Cited

UNITED STATES PATENTS

| | | |
|---|---|---|
| 1,986,165 | 1/1935 | Sieck. |
| 2,523,441 | 9/1950 | McKamy. |
| 3,279,533 | 10/1966 | Kersteter et al. |
| 3,293,151 | 12/1966 | Holzer et al. |
| 3,334,027 | 8/1967 | Goeldner. |
| 3,361,649 | 1/1968 | Karter. |

NORMAN YUDKOFF, Primary Examiner

D. EDWARDS, Assistant Examiner

U.S. Cl. X.R.

202—197, 199; 203—42; 261—114